United States Patent [19]
Robinson et al.

[11] 3,770,406
[45] Nov. 6, 1973

[54] MANUFACTURE OF WIRED GLASS ON MOLTEN METAL BATH

[75] Inventors: Albert Sidney Robinson, Birkdale, Southport; David Gordon Loukes, Eccleston Park, Prescot; Jack Lawrenson, St. Helens, all of England

[73] Assignee: Pilkington Brothers Limited, Liverpool, Lancashire, England

[22] Filed: Sept. 11, 1972

[21] Appl. No.: 287,715

[30] Foreign Application Priority Data
Sept. 16, 1971 Great Britain .................. 43,268/71

[52] U.S. Cl. .................... 65/51, 65/99 A, 65/146, 65/182 R
[51] Int. Cl. ...................... C03b 13/12, C03b 18/00
[58] Field of Search ..................... 65/146, 51, 99 A, 65/182 R, 147

[56] References Cited
UNITED STATES PATENTS
3,582,302   6/1971   Kita et al. .......................... 65/146 X
3,721,543   3/1973   Classen et al. .................. 65/99 A X

*Primary Examiner*—Robert L. Lindsay, Jr.
*Attorney*—Peter H. Smolka et al.

[57] ABSTRACT

Wired glass is produced by forming a pool of molten glass on a bath of molten metal, holding back the pool by a flow regulating member and drawing a ribbon of glass away from the downstream end of the pool. Reinforcing wire is fed into the pool upstream of the flow regulating member and is guided beneath that member. The glass is heated in the region of the flow regulating member and the ribbon of wired glass is rapidly cooled and stabilised as it is drawn away from the downstream end of the pool.

14 Claims, 8 Drawing Figures

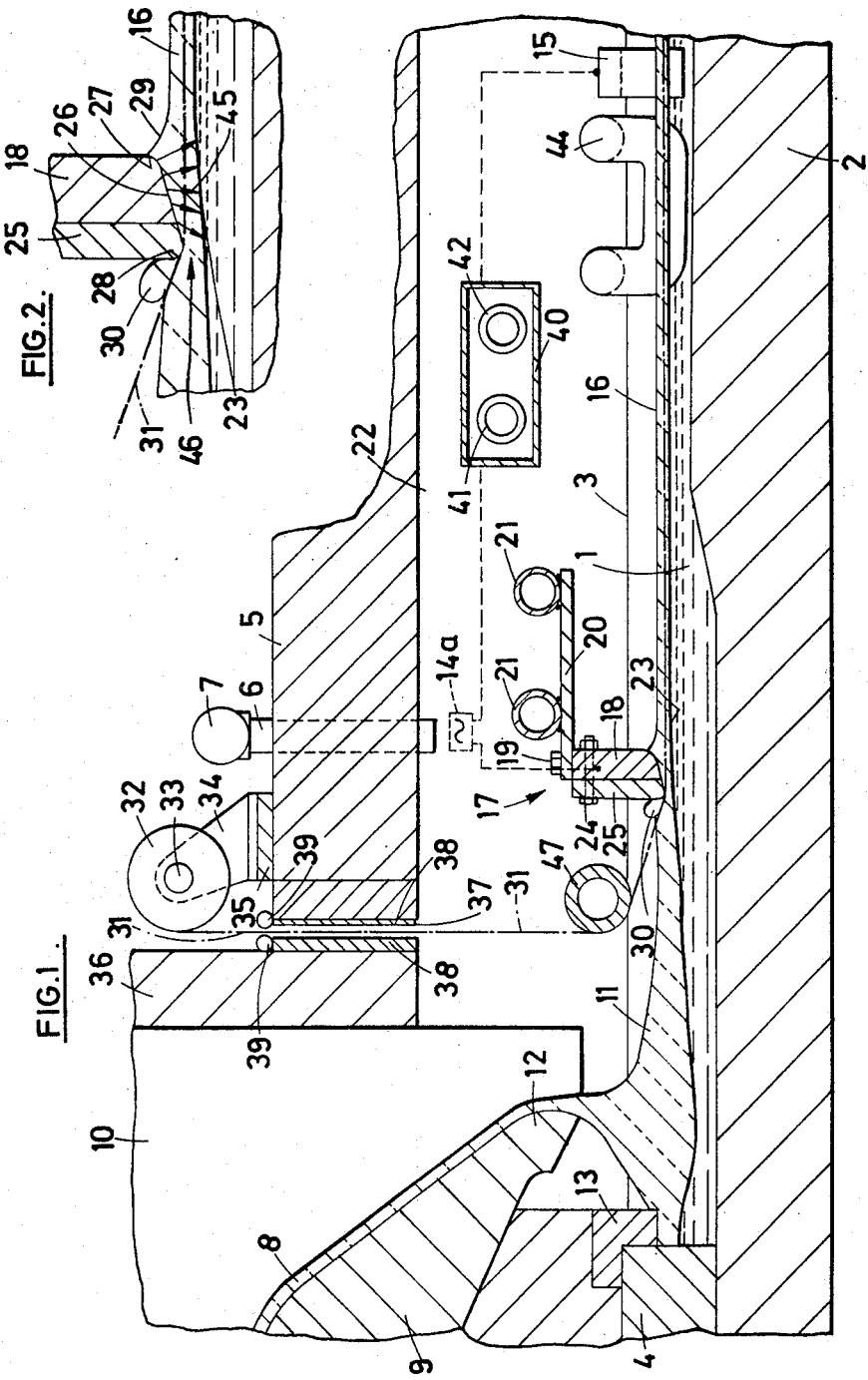

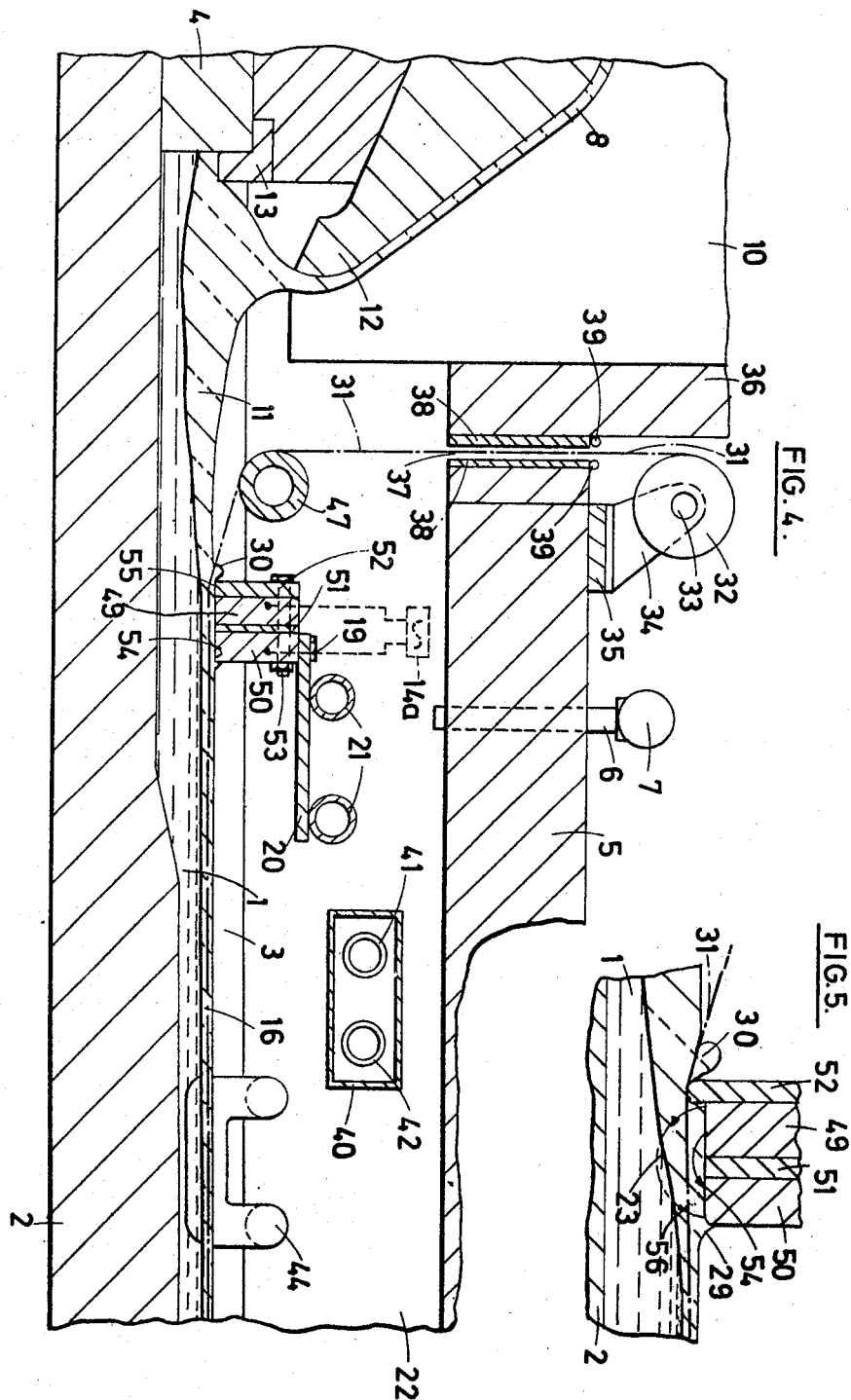

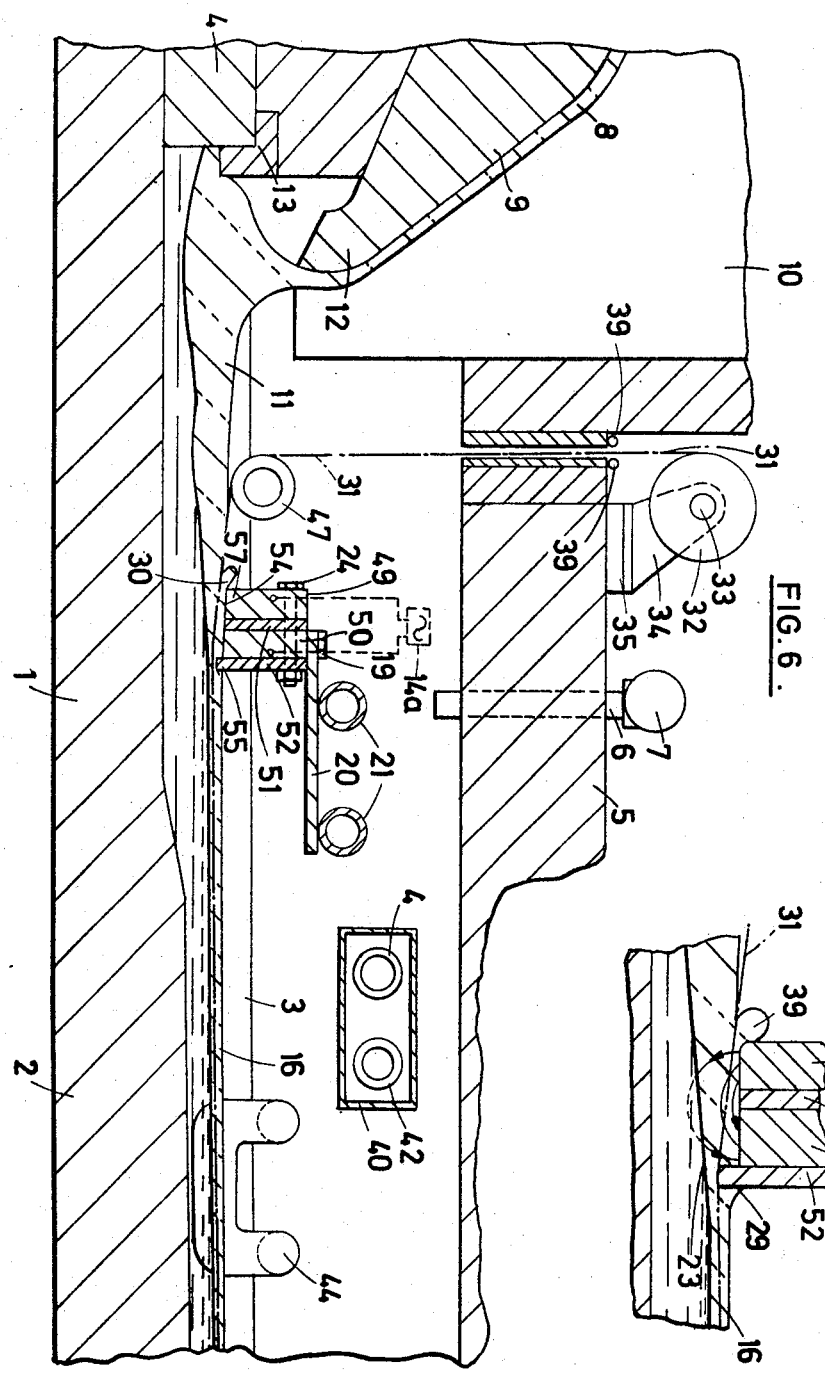

3,770,406

MANUFACTURE OF WIRED GLASS ON MOLTEN METAL BATH

BACKGROUND OF THE INVENTION

1. Field of the Invention

This invention relates to the manufacture of wired glass and more especially to the manufacture of flat glass which is reinforced by a wire web embodied in the glass.

2. Description of the Prior Art

It has been customary to manufacture wire reinforced glass by rolling a ribbon of glass using an arrangement of two rolling machines the first of which rolls a thin ribbon of glass on to which the reinforcing wire web is fed as that thin ribbon advances to pass between the rollers of a second rolling machine where molten glass is fed on to the first formed ribbon. The composite of glass and wire is then rolled by the second machine to produce an integrally rolled ribbon of wired glass. Subsequent costly grinding and polishing of the glass is necessary after the glass has been cut into sheets.

There have also been proposals for manufacturing a ribbon of wired glass on a bath of molten metal, the reinforcing wire web being embodied in the glass by feeding the wire web downwardly into an already formed ribbon of glass or by feeding the wire web into a head of molten glass supported on a molten metal bath. The web is incorporated into the glass which flows beneath a cooled and non-wetted member which holds back the head of molten glass.

These previous proposals for the manufacture of wired glass on a molten metal bath have been unsatisfactory because of distortion of the upper surface of the glass giving a "basket-weave" or "dimpling" effect on the upper surface, which surface distortions are believed to be associated with sinking of the wire web in the molten glass after the formation of the ribbon of wired glass.

It is a main object of the present invention to overcome the disadvantages of these prior proposals by providing a method and apparatus for manufacturing wire web reinforced flat glass on a bath of molten metal without production of unacceptable surface distortion in the ribbon.

SUMMARY

Wire reinforced glass is manufactured by pouring molten glass on to a molten metal bath over which there is a protective atmosphere to form a molten glass pool which is held back by a flow regulating member mounted transversely of and just above the bath surface which member is wetted by the molten glass. The glass in the region of the flow regulating member is heated to expedite glass flow from the pool into a ribbon of glass drawn away from the downstream end of the pool and reinforcing wire is continuously fed into the pool upstream of the member and is guided in a path beneath that member leading into the centre of the ribbon of glass. The ribbon of wired glass so formed is rapidly formed to stabilise the position of the reinforcing wire in the ribbon.

The rapid heating and cooling cycle to which the glass is subjected as the wire is embodied into the glass avoids undue sinking of the wire web within the glass and thereby avoids unacceptable surface distortions.

BRIEF DESCRIPTION OF THE DRAWINGS

FIG. 1 is a vertical cross-section through the inlet end of a tank structure containing an elongated bath of molten metal and illustrating one method and apparatus for manufacturing wired glass according to the invention, FIG. 2 is a detailed view of part of FIG. 1, FIG. 4 is a view similar to FIG. 1 illustrating another embodiment of the invention, FIG. 5 is a detailed view of part of FIG. 4, FIG. 6 is a cross-section similar to FIG. 1, through apparatus according to another embodiment of the invention, FIG. 7 is a detailed view of part of the apparatus of FIG. 6.

DESCRIPTION OF THE PREFERRED EMBODIMENTS

Figure 3:
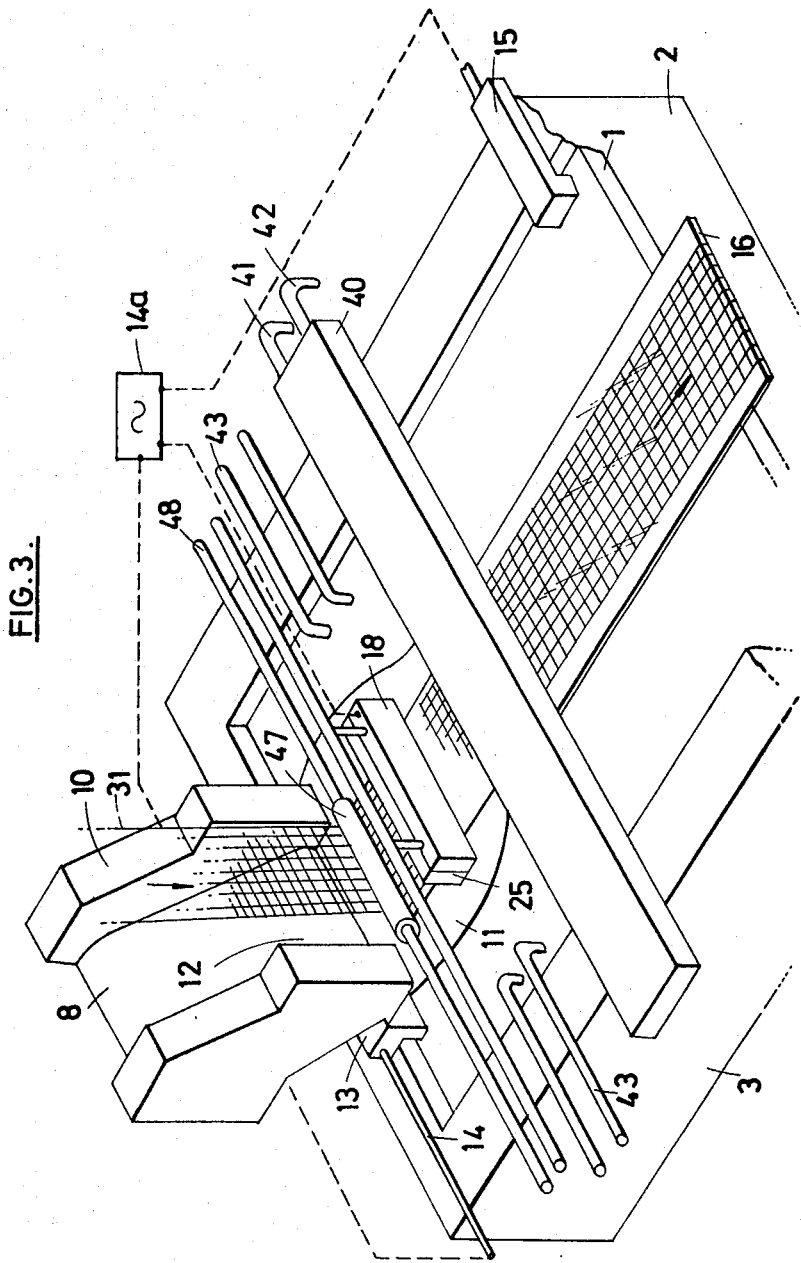
FIG. 3 is a perspective view of the apparatus of FIG. 1.

Referring to FIGS. 1, 2 and 3 an elongated bath 1 of molten metal, for example molten tin or a molten tin alloy having a specific gravity greater than that of glass is contained in a tank structure of the kind generally used in the float process for the manufacture of flat glass in ribbon form which tank structure comprises a floor 2, side walls 3 and an end wall 4 at the inlet end of the tank structure. The inlet end or hot end only is illustrated. A roof 5 is supported over the tank structure to define a headspace over the bath in which a plenum of protective atmosphere is maintained, for example an atmosphere consisting of 95% nitrogen and 5% hydrogen. The atmosphere is supplied through ducts passing through the roof 5 in the usual manner for supplying atmosphere in the float process, one of which ducts 6 is illustrated connected to a header 7.

Molten glass 8 is poured on to the bath 1 by a spout 9 which projects over the inlet end of the bath 1 being located above the inlet end wall 4. The spout 9 has side walls 10 and dips downwardly towards the bath surface. The molten glass poured on to the bath forms a pool 11 of molten glass which is supported on the bath surface and flows forwardly away from the spout. The pool 11 is deepest beneath the spout lip 12 and the molten glass of the pool wets back on to an electrical heater tile 13 which is mounted on the end 4 and is supplied with heating current through a connector 14 as shown in FIG. 3. The connector 14 is connected to a 50 Hz A.C. supply circuit 14a which circuit is indicated diagrammatically in FIG. 3.

A return electrode 15 connected to the supply circuit 14a dips into the molten metal bath 1 alongside the path of travel of the eventual ribbon of wired glass 16.

The molten glass fed into the pool 11 from the spout 8 has a forward momentum which carries the molten glass forwardly along the bath into the pool which forward movement is enhanced by traction applied to the eventual ribbon of wired glass 16 at the outlet end of the tank structure where the ribbon, after it has been cooled to about 650° C, is discharged through an outlet from the tank structure in a manner which is conventional in the float process.

Flow of molten glass from the pool 11 into the ribbon 16 which is drawn away from the downstream end of the pool, is regulated by means of a flow regulating member indicated generally at 17. The flow regulating member is a rigid refractory member of a material which is wetted by the molten glass and is mounted transversely of and just above the bath surface.

The rigid refractory member 17 is a composite member comprising a bar-shaped electrode 18 of refractory electrically-conductive material, for example heat-resisting stainless steel, molybdenum, carbon, tungsten, tantalum, niobium, iridium, ruthenium, palladium, or platinum. In the preferred embodiment the bar 18 is of heat-resisting stainless steel. This electrode 18 is bolted at 19 to a support plate 20 which is welded to two water-cooled tubes 21. The tubes 21 extend through the side-walls 22 of the roof structure over the bath and the tubes 21 and the support plate 20 together constitute a water-cooled electrode support beam structure. The cooling of the tubes 21 ensures accurate location of the electrode 18 relatively to the bath surface 23 beneath the electrode.

Bolted to the front face of the electrode 18 by means of bolts 24 is a transverse member 25 of refractory electrically insulating material which has acceptable resistance to glass attack and thermal shock and is compatible with the other electrode materials. For example a sillimanite bar may be used or a bar of a sintered fused silica grain refractory. The insulating member 25 dips deeper towards the bath surface 23 than does the lower edge of the metal electrode 18. As shown in FIG. 2 the bottom surface of the composite flow member 18, 25 has an upward slope indicated at 26 and the corners have a rounded shape as indicated 27 and 28. The molten glass wets on to the downstream rounded corner 27 to form a meniscus 29 from which meniscus the upper surface of the eventual ribbon 16 of wired glass is drawn. The upstream face of the insulating member 25 effectively holds back molten glass in the pool 11 as indicated by the wave or bolster 30 of molten glass which develops upstream of the corner 28 of the insulating member. Wire web 31 which is to be embodied in the ribbon 16 is fed into the molten glass just upstream of this bolster 30 as will now be described.

A reel 32 of wire web, for example 26 gauge mild steel Georgian wire web, that is web with a rectangular wire mesh, is mounted on a shaft 33 carried out by brackets 34 on an electrically insulating base 35 which is fixed to the upper surface of a roof 5 near to the spout. A shut-off member 36 separates the spout 9 from the roof 5 and between the shut-off member 36 and the roof 5 a slot 37 for the downward feeding of wire web 31 into the headspace over the bath is defined between an electrically insulating lining 38 for the slot 37. The lining is for example of a refractory material, e.g., sillimanite.

Protective atmosphere escapes from the headspace upwardly through the slot 37 and sealing of the slot is assisted by slotted tubes 39 mounted at the upper end of the slot 37. The slots in the tubes are set horizontally and facing each other. Protective atmosphere, the same as that supplied through the ducts 6 to the headspace, is supplied to the tubes 39 and escapes from the slots in the tubes to form a gas curtain directed across the upper end of the slot 37. This gas curtain minimises the rate of atmosphere loss through the slot 37 and also provides a region of hot reducing gas surrounding the web 31 as it first encounters the high temperature conditions near to the entrance to the slot.

An overhead cooler 40 with supply and exhaust tubes 41 and 42 extends right across the tank structure between the side walls as shown more clearly in FIG. 3. In addition coolers for the molten metal in the form of U-shaped tubes dipping into the bath 1 are alongside the composite refractory member 18, 25 as illustrated in FIG. 3. Additional coolers may be provided in the sides of the bath downstream of the overhead cooling box 40, as indicated at 44 in FIG. 1.

A separate regulatable output from the electric power supply circuit 14a is connected to the metal electrode bar 18 to supply alternating current to the bar 18. The current path between the bottom face 26 of the electrode bar 18 and the molten metal of the bath is indicated at 45 in FIG. 2.

This electric current flow locally heats the glass in the region of the electrode 18 to expedite glass flow, indicated at 46, from the pool 11 and into the ribbon 16.

The web 31 passing through the slot 37 passes downwardly around a driven wire guide roller 47 which may for example be a steel roller mounted on a shaft 48 which passes through the side walls 22 of the roof structure. The roller 47 may be grooved or notched to provide a positive drive for the web and thereby control the tension in the web. Alternatively the roller may be a carbon roller which is free-running on a cooled shaft.

This guide roller 47 guides the web 31 downwardly into the pool 11 just in front of the wave 30 of molten glass and the web 31 engages the rounded corner 28 of the insulating member 25. The juxtaposition of the roller 47 relative to the bottom corner 28 of the member 25 is such that the web 31 is guided in a path beneath the electrode member 18 which path leads into the centre of the ribbon of glass 16.

In small scale experimental operation of the embodiment of FIGS. 1 to 3 molten glass pours over the spout 9 at a load of 60 tonnes per week and the molten glass 8 is at a temperature in the range 1,150° to 1,200° C. The width of the spout 9 is 240 mm and glass at this high temperature fed into the pool 11 spreads as illustrated in FIG. 3 to a ribbon width of about 360 mm. There is some cooling of the glass as it reaches the bath and the glass flows are enhanced by heating in the region of the wet-back tile 13. The composite member 18, 25 is 200 mm long. The refractory metal bar 18 is 25 mm wide, in the direction of glass advance, and the insulating member 25 is 10 mm wide.

Mild steel Georgian wire web, 26 gauge, 230 mm wide is fed downwardly for incorporation into the ribbon of glass. The A.C. supply to the electrode 18 from the 50 Hz supply circuit 14a is 15 volts, 100 amps, with a power dissipation of about 1.5 kW. The local heating of the glass beneath the electrode raises the glass temperature to a region of 1,150° C and this rapid heating of the glass ensures that the wire web settles into the glass without generating distorting forces in the glass. The frequency of the supply may be varied, for example a supply frequency of 500 Hz or 1,000 Hz or higher may be used. The viscosity of the glass beneath the electrode 18 is so low, e.g., $2.2 \times 10^3$ poises at 1,150° C for normal soda-lime-silica glass, that there is no viscous drag on the glass by the wire web. The upper surface of the glass forms a meniscus 29 wetted on to the corner 27 of the heated electrode 18 and as the ribbon of glass 16 is drawn away from the member 18 with the reinforcing wire web centrally located in the ribbon, the upper surface of the glass is formed. The lower surface of the ribbon 16 has already been formed in contact with the surface 23 of the molten metal bath beneath the electrode 18 and the formation of the upper surface from the low viscosity meniscus 29 after the wire web has already settled into its central location in the glass, ensures flat fire-polished and distortion-free surfaces for both the upper and lower surface of the ribbon of wired glass 16. When it has been formed the ribbon is subjected to a certain amount of cooling by the cooled beam tubes 21. The presence of these tubes assists immediate setting of the formed upper surface. Thereafter a more massive cooling is effected by the overhead cooling box 40 assisted by the cooling tubes 43 and 44 which withdraw heat from the lower surface of the ribbon through the medium of the bath metal.

The position of the reinforcing wire in the ribbon is thereby stabilised immediately after the ribbon has been formed. Cooling continues down to a temperature of about 650° C at which the ribbon of wired glass is taken from the bath. At a speed of 50 metres per hour the ribbon was 8 mm thick. As the speed increased, with all other conditions equal, the ribbon thickness dropped. At 75 metres per hour output the ribbon thickness was 7 mm. At a speed of 97 metres per hour the ribbon thickness was 6 mm. These results were all achieved without any deterioration in the distortion-free quality of the ribbon surfaces.

For full scale operation at a load of 1,000 tonnes per week, the spout was 2.3 m wide and the speed of discharge of the ribbon of wired glass was 280 metres per hour.

The embodiment of FIGS. 4 and 5 differs from that of FIGS. 1 to 3 in the construction of the rigid refractory member which regulates the flow of molten glass from the pool 11 and guides the wire web 31 into the ribbon 16. The refractory member is constituted as two metal electrode bars shown as transverse bars 49 and 50 of heat resistant stainless steel. The downstream electrode bar 50 is bolted at 19 to the support plate 20 and a strip 51 of the electrically insulating refractory material, e.g., sillimanite, is positioned between the electrode bars 49 and 50. A wire immersion guide plate 52 of electrically insulating refractory material, e.g., sillimanite, is fixed to the upstream face of the electrode bar 49. The whole structure is bolted together by bolts indicated at 57 which are electrically insulated.

In the experimental plant with a load of 60 tonnes per week, and wire web width of 230 mm, the composite rigid refractory member is 200 mm long, the metal bars 49 and 50 are 12 mm wide and the insulating strips 51 and 52 are 6 mm wide.

The wire guide 52 dips downwardly about 7 mm into the molten glass flow below the level of the horizontal lower face 54 of the electrode bars 49 and 50. The bottom edge of the member 52 is rounded as indicated at 55 and this rounded bottom edge is so located relative to the wire guide roller 47 that the wire web is fed just upstream of the wave or bolster 30 of molten glass and is guided beneath the lower horizontal face of the electrodes 49 and 50.

The electrode bars 49 and 50 are separately connected to the terminals of a single phase A.C. supply circuit 14a which supplies a current of 250 amps at 20 volts, and there is a current path, indicated at 56 in FIG. 5, between the lower faces of the electrode bars.

The current path is mainly through the molten glass flowing beneath the composite electrode structure and there will also be some current flow into and through the surface 23 of the molten metal beneath the electrode structure.

The power dissipation in the glass of about 5 kW heats the glass rapidly as it flows beneath the electrodes and while the wire web 31 is settling into the glass. This rapid heating followed by the formation of the ribbon surfaces from the low viscosity glass in the same manner as described in FIGS. 1 to 3 ensures the formation of the distortion-free ribbon of wired glass 360 mm wide and 8 mm thick, which was discharged at the rate of 50 metres per hour.

A variation of the composite electrode structure is illustrated in FIGS. 6 and 7. The wire guiding member 52 of insulating materials, e.g., sillimanite is fixed to the rear face of the composite member, that is the downstream face of the steel electrode bar 50. The electrode is 200 mm long, the bars 49 and 50 are 12 mm wide and the insulating members 51 and 52 are 6 mm wide. The curved lower edge 55 of the member 52 dips down into the molten glass about 7 mm beneath the level of the horizontal face 54 of the electrode bars 49 and 50 to guide the reinforcing wire web 31 beneath the front refractory metal bar 49 in a path spaced from that bar. To ensure separation of the web 31 from the bar 49 the upstream lower corner of the bar is rounded as indicated at 57. Further the guide roller 47 is located closer to the bath surface so that the web 31 enters the glass some little way upstream of the bolster 30 and continues into the glass and beneath the wire guiding edge 55 at a slightly shallower angle than in the previous embodiments. As shown in FIG. 7 the meniscus 29 wets on to the downstream face of the insulating refractory material 52 and the upper surface of the ribbon 16 of wired glass is drawn away from that meniscus. Alternating current of 250 amps at 20 volts flows through the glass between the lower faces of the bars 49 and 50 in the same manner as previously described, with a power dissipation of about 5 kW, to ensure low viscosity glass flow beneath the composite electrode as the wire is embodied into the glass. The ribbon so produced is rapidly cooled to stabilise the position of the reinforcing wire in the ribbon and cooling continues as the ribbon advances towards the outlet end of the bath.

At a load of 70 tonnes per week a ribbon 420 mm wide was produced, 8 mm thick and discharged at 50 metres per hour.

Figure 8:
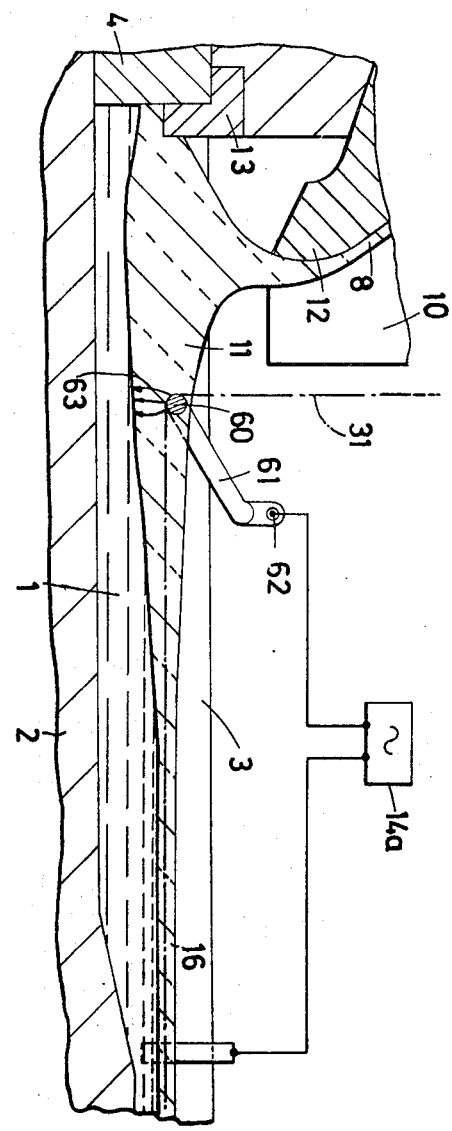
FIG. 8 illustrates yet another method of carrying out the invention.

Yet another embodiment of the invention is illustrated diagrammatically in FIG. 8.

The flow regulating member is a heat resistant stainless steel bar 60 of circular cross-section which is totally submerged in the molten glass of the pool 11. The bar 60 extends between end brackets 61 which are electrically conducting and are connected to the supply of current by a connector 62. The current flows through the molten glass beneath the submerged member 60 as indicated at 63 and heats the molten glass to a low viscosity. The wire web 31 is fed directly downwardly to the submerged member 60 and passes vertically through the glass surface and then is embodied in the low viscosity glass flowing beneath the member 60. This submerged member regulates the flow of molten glass from the pool along the bath surface and surface flow of molten glass in the pool above the submerged member 60 is also enhanced by the heating in the region of the member 60 to form a flat fire-finished upper surface for the eventual ribbon of wired glass 16. The wire web is thus centrally guided into the glass from which the ribbon is drawn while that ribbon is being formed at low viscosity so that distortion of the glass surfaces by the settling of the wire web into the glass is avoided.

The wire mesh being fed downwardly is in this embodiment in electrical connection with the heating electrode 60 but the wire feeding arrangements are electrically insulated in the same manner as described with reference to FIG. 1.

In a test run employing this method the load was 60 tonnes per week, the bar 60 was 550 mm long and 12 mm in diameter and the same wire web 230 mm wide was used. The current flowing was 260 amps at 7 volts with a power dissipation of 1.8 kW. A ribbon of wired glass 450 mm wide and 4.2 mm thick was produced and was discharged at a speed of 75 metres per hour.

The invention thus provides a new method and apparatus for the production of wired glass on a bath of molten metal, the ribbon of glass having the reinforcing wire centrally located in the ribbon and having fire-polished flat parallel surfaces of the kind associated with float glass and with no substantial surface distortion of the kind formerly produced when reinforcing wire web is embodied into the glass.

As well as using rectangular mesh Georgian wire web, diamond shaped mesh or even straight longitudinal wires may be embodied in the ribbon of glass by the method of the invention.

We claim:

1. A method of manufacturing wired glass comprising pouring molten glass at a controlled rate on to a bath of molten metal over which a protective atmosphere is maintained to form a pool of molten glass on the bath, regulating flow of molten glass from the pool into a ribbon of glass drawn away from the downstream end of the pool, by means of a flow regulating member mounted transversely of and just above the bath surface which member is wetted by the molten glass, continuously drawing the ribbon of glass away from the downstream end of the pool by traction applied to the ultimate ribbon of glass, locally heating the glass in the region of that member to expedite glass flow from the pool and into the ribbon, continuously feeding reinforcing wire into the pool upstream of said member, guiding the reinforcing wire in a path beneath said member leading into the centre of the ribbon of glass, and rapidly cooling the ribbon of wired glass so formed to stabilise the position of the reinforcing wire in the ribbon.

2. A method according to claim 1, comprising regulating flow of molten glass from the pool by means of a rigid refractory member.

3. A method according to claim 2, comprising constituting said rigid refractory member as an electrode, locally heating the glass by passing electric current between that electrode and a second electrode contacting the glass thereby heating the molten glass flowing beneath the refractory member to form the ribbon, and guiding the reinforcing wire beneath the electrode in a path spaced from the electrode.

4. A method according to claim 3, comprising passing the electric current between the refractory member an the molten metal bath.

5. A method according to claim 2, comprising constituting said rigid refractory member as two insulated electrodes both contacting the molten glass, and locally heating the glass by passing electric current between said two electrodes thereby heating the molten glass flowing beneath the refractory member to form the ribbon, and guiding the reinforcing wire beneath the electrodes in a path spaced from both electrodes.

6. A method according to claim 2, comprising constituting said rigid refractory member as an electrode totally submerged in the molten glass, and locally heating the glass flow beneath the submerged member by passing electric current between that member and the molten metal bath.

7. Apparatus for manufacturing wired glass, comprising a tank structure containing a bath of molten metal, means at one end of the tank structure for pouring molten glass on to the bath at a controlled rate to form a pool of molten glass on the bath, traction means at the opposite end of the tank structure for discharging an ultimate ribbon of wired glass from the bath, means for maintaining a plenum of protective atmosphere over the bath, a flow regulating member mounted in the tank structure transversely of and just above the bath surface to engage the surface of the molten glass pool, which member is of a material wetted by the molten glass, reinforcing wire feeding means mounted above the bath and including guiding means for guiding reinforcing wire into a path beneath said member leading into the centre of the ultimate ribbon of glass local heating means associated with said member for heating the molten glass flowing beneath the member to constitute the ribbon, and cooling means mounted in the tank structure downstream of said member for rapidly cooling the ribbon of wired glass to stabilise the position of the reinforcing wire in the ribbon.

8. Apparatus according to Claim 7, wherein the flow regulating member is a rigid refractory member of a material which is wettable by molten glass.

9. Apparatus according to claim 8, wherein said rigid refractory member is a composite body comprising a bar of refractory elecrically conductive material to which is fixed a transverse member of refractory insulating material which dips deeper towards the bath surface than the electrically conductive bar and whose lower edge is shaped to guide the reinforcing wire in a path spaced from the lower edge of the electrically conductive bar.

10. Apparatus according to claim 9, wherein the electrically conductive bar is a metal bar and the wire guiding member of insulating material is fixed to the front surface of the metal bar as a facing to hold back the molten glass pool.

11. Apparatus according to claim 9, comprising a return electrode dipping into the molten metal bath, to permit passage of electric current between said metal bar and the molten metal bath.

12. Apparatus according to claim 10, wherein the refractory member comprises a second bar of refractory electrically conductive material fixed behind said faced bar and spaced therefrom by a refractory insulating member, which two electrically conductive bars define a path for electric current through the glass into which the reinforcing wire is being incorporated.

13. Apparatus according to claim 9, wherein the composite refractory member comprises two bars of refractory electrically conductive material fixed to each other and separated by a refractory insulating member, and the wire guiding member of insulating material is fixed to the rear face of said composite member and dips sufficiently towards said bath surface to guide the reinforcing wire beneath the front electrically conductive bar in a path spaced therefrom.

14. Apparatus according to claim 7, wherein said cooling means includes an overhead cooler extending across the tank structure just downstream of said refractory member, and coolers dipping into the molten metal bath alongside the path of travel of the ribbon of wired glass.

* * * * *